United States Patent
Lin et al.

(10) Patent No.: US 11,330,172 B2
(45) Date of Patent: May 10, 2022

(54) PANORAMIC IMAGE GENERATING METHOD AND APPARATUS

(71) Applicant: Hangzhou Hikvision Digital Technology Co., Ltd., Hangzhou (CN)

(72) Inventors: Yaodong Lin, Hangzhou (CN); Jie Chen, Hangzhou (CN); Xin Zhang, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 246 days.

(21) Appl. No.: 16/344,534

(22) PCT Filed: Oct. 17, 2017

(86) PCT No.: PCT/CN2017/106533
§ 371 (c)(1),
(2) Date: Apr. 24, 2019

(87) PCT Pub. No.: WO2018/077071
PCT Pub. Date: May 3, 2018

(65) Prior Publication Data
US 2019/0289205 A1    Sep. 19, 2019

(30) Foreign Application Priority Data

Oct. 25, 2016   (CN) .......................... 201610935069.2

(51) Int. Cl.
*H04N 7/00*    (2011.01)
*H04N 5/232*   (2006.01)
(Continued)

(52) U.S. Cl.
CPC ......... *H04N 5/23238* (2013.01); *G06T 3/005* (2013.01); *G06T 3/4038* (2013.01);
(Continued)

(58) Field of Classification Search
USPC ....................................... 386/36; 348/36, 42
See application file for complete search history.

(56) References Cited

U.S. PATENT DOCUMENTS 8,319,825 B1 * 11/2012 Urbach ................... G06T 15/08
348/42
8,988,509 B1 *  3/2015 Macmillan ........... H04N 5/3532
348/47
(Continued)

FOREIGN PATENT DOCUMENTS

CN         101271582 A        9/2008
CN         101625766 A        1/2010
(Continued)

OTHER PUBLICATIONS

Ricardo Cabral et al.: "Piecewise Planar and Compact Floorplan Reconstruction from Images", 2014 IEEE Conference on Computer Vision and Pattern Recognition, Jun. 2014, pp. 628-635, XP055406009, sections 3-5.

(Continued)

*Primary Examiner* — Nigar Chowdhury
(74) *Attorney, Agent, or Firm* — Clements Bernard Baratta; Lawrence A. Baratta, Jr.

(57) ABSTRACT

The present application discloses a method and apparatus for generating a panoramic image. A cuboid three-dimensional image of each local space is determined according to an original two-dimensional image of each local space in the overall space and a preset cuboid model corresponding to each local space, and then a three-dimensional panoramic image of the overall space is generated according to all determined cuboid three-dimensional images. Since the three-dimensional panoramic image of the overall space is generated according to the cuboid three-dimensional images of all local spaces, the overall space may be visually viewed (Continued)

at a three-dimensional angle of view to achieve the three-dimensional real-scene effect.

13 Claims, 7 Drawing Sheets

(51) Int. Cl.
| | |
|---|---|
| *G06T 15/00* | (2011.01) |
| *G06T 15/10* | (2011.01) |
| *G06T 15/04* | (2011.01) |
| *G06T 3/00* | (2006.01) |
| *G06T 3/40* | (2006.01) |
| *H04N 13/00* | (2018.01) |

(52) U.S. Cl.
CPC ............ *G06T 15/005* (2013.01); *G06T 15/04* (2013.01); *G06T 15/10* (2013.01); *H04N 2013/0088* (2013.01)

(56) References Cited

U.S. PATENT DOCUMENTS

| | | | | |
|---|---|---|---|---|
| 9,098,754 | B1* | 8/2015 | Stout | G01S 17/931 |
| 9,277,122 | B1* | 3/2016 | Imura | G06T 7/292 |
| 9,369,689 | B1* | 6/2016 | Tran | G01S 7/4972 |
| 9,400,939 | B2 | 7/2016 | Lin et al. | |
| 9,521,398 | B1* | 12/2016 | Woodman | H04N 13/286 |
| 9,754,413 | B1* | 9/2017 | Gray | G06T 17/005 |
| 9,881,425 | B1* | 1/2018 | Scott | G06T 15/20 |
| 10,027,888 | B1* | 7/2018 | Mackraz | H04N 13/383 |
| 10,127,632 | B1* | 11/2018 | Burke | G06T 3/4038 |
| 10,142,540 | B1* | 11/2018 | Ribeiro | H04N 5/23238 |
| 10,277,813 | B1* | 4/2019 | Thomas | H04N 5/23206 |
| 10,412,413 | B2 | 9/2019 | Izumi | H04N 21/2343 |
| 10,911,781 | B2* | 2/2021 | Izumi | H04N 19/132 |
| 2006/0132482 | A1* | 6/2006 | Oh | G06T 3/0012 345/419 |
| 2009/0079730 | A1 | 3/2009 | Lee et al. | |
| 2010/0329513 | A1* | 12/2010 | Klefenz | G06K 9/00805 382/104 |
| 2012/0033069 | A1* | 2/2012 | Becker | G01S 17/42 348/135 |
| 2013/0002649 | A1* | 1/2013 | Wu | G06T 19/006 345/419 |
| 2013/0321568 | A1* | 12/2013 | Suzuki | H04N 5/23238 348/36 |
| 2013/0326419 | A1* | 12/2013 | Harada | H04N 5/23238 715/838 |
| 2014/0085412 | A1* | 3/2014 | Hayashi | G06T 11/60 348/37 |
| 2014/0118479 | A1* | 5/2014 | Rapoport | H04N 1/00183 348/36 |
| 2014/0248950 | A1* | 9/2014 | Tosas Bautista | G06F 1/1694 463/31 |
| 2014/0267592 | A1* | 9/2014 | Lee | H04N 5/232945 348/36 |
| 2014/0340427 | A1* | 11/2014 | Baker | H04N 13/207 345/641 |
| 2015/0055929 | A1* | 2/2015 | Van Hoff | G06F 3/04815 386/201 |
| 2015/0163473 | A1* | 6/2015 | Osawa | G06T 3/4038 348/53 |
| 2015/0302633 | A1* | 10/2015 | Li | G09G 5/14 345/419 |
| 2015/0341552 | A1* | 11/2015 | Chen | G06T 17/00 348/38 |
| 2015/0358612 | A1* | 12/2015 | Sandrew | H04N 13/128 348/36 |
| 2015/0358613 | A1* | 12/2015 | Sandrew | G06T 15/205 348/36 |
| 2015/0364159 | A1* | 12/2015 | Ushiyama | H04N 21/4668 386/230 |
| 2016/0044240 | A1* | 2/2016 | Beers | G06T 7/344 348/36 |
| 2016/0071238 | A1* | 3/2016 | Kimura | H04N 5/23238 348/36 |
| 2016/0097858 | A1* | 4/2016 | Mundhenk | G06T 5/50 348/50 |
| 2016/0210602 | A1* | 7/2016 | Siddique | G06Q 10/0637 |
| 2016/0234475 | A1* | 8/2016 | Courchesne | G06V 40/176 |
| 2016/0353089 | A1* | 12/2016 | Gallup | H04N 13/344 |
| 2016/0353090 | A1* | 12/2016 | Esteban | H04N 13/221 |
| 2016/0360104 | A1* | 12/2016 | Zhang | H04N 5/23261 |
| 2017/0018086 | A1* | 1/2017 | Zhang | H04N 5/232 |
| 2017/0024928 | A1* | 1/2017 | Su muth | G06T 19/20 |
| 2017/0076429 | A1* | 3/2017 | Russell | G03B 37/04 |
| 2017/0127045 | A1* | 5/2017 | Lin | G06T 7/80 |
| 2017/0134713 | A1* | 5/2017 | Lin | H04N 13/106 |
| 2017/0195560 | A1* | 7/2017 | Veldandi | H04N 5/23238 |
| 2017/0251204 | A1* | 8/2017 | Gupte | H04N 19/154 |
| 2017/0287107 | A1* | 10/2017 | Forutanpour | G06T 3/0062 |
| 2017/0295358 | A1* | 10/2017 | Cabral | H04N 5/247 |
| 2018/0040164 | A1* | 2/2018 | Newman | G09G 3/2092 |
| 2018/0144547 | A1* | 5/2018 | Shakib | G06T 15/60 |
| 2018/0174619 | A1* | 6/2018 | Roy | H04N 13/00 |

FOREIGN PATENT DOCUMENTS

| | | |
|---|---|---|
| CN | 101814181 A | 8/2010 |
| CN | 101895693 A | 11/2010 |
| CN | 101968890 A | 2/2011 |
| CN | 102013110 A | 4/2011 |
| CN | 103873758 A | 6/2014 |
| CN | 103971399 A | 8/2014 |
| CN | 105678729 A | 6/2016 |
| CN | 105791695 A | 7/2016 |

OTHER PUBLICATIONS

Dirk Farin et al: "Floor-plan reconstruction from panoramic images", Proceedings of the 15th International Conference on Multimedia 2007, Augsburg, Germany, Sep. 24-29, 2007, ACM, US, Sep. 29, 2007, pp. 823-826, XP058406011, section 2.
Trung Kien Dang et al: "A semi-interactive panorma based 3D reconstruction framework for indoor scenes", Computer Vision and Image Understanding, Academic Press, US vol. 115, No. 11, Jul. 13, 2011, pp. 1516-1524, XP028296426, section 4, in particular 4.5; figure 6.
International Search Report for International Application No. PCT/CN2017/106533 dated Jan. 11, 2018.
Miao et al., "Dense Multi-planar Scene Reconstruction from Sparse Point Cloud," Acta Automatica Sinica, vol. 41, No. 4, Apr. 2015, pp. 1-10.
Sep. 28, 2020, First Office Action for CN Application No. 201610935069.2, pp. 1-6.
K. Kottari et al., "Shape Reconstruction using Fisheye and Projective Cameras", IEEE Instrumentation and Measurement Society, 2016, pp. 1-6.
Z. Jingkai et al., "3D Indoor Scene Reconstruction With the Active Omni-directional Vision Sensor", Dissertation Submitted to Zhejiang University of Technology for the Degree of Master, College of Information Engineering Zhejiang University of Technology, May 2015, pp. 1-69.
Mar. 10, 2021, Second Office Action of the priority CN application No. 201610935069.2, pp. 1-4.

\* cited by examiner

PANORAMIC IMAGE GENERATING METHOD AND APPARATUS

The present application claims the priority to a Chinese patent application No. 201610935069.2, filed with China National Intellectual Property Administration on Oct. 25, 2016 and entitled "Method and apparatus for generating panoramic image", which is incorporated herein by reference in its entirety.

TECHNICAL FIELD

The present application relates to the field of image processing, in particular to a method and apparatus for generating a panoramic image.

BACKGROUND

A panoramic image is also known as a three-dimensional real-scene image. The panoramic image of an overall space is obtained by capturing images of the overall space at different angles with a camera, and stitching the captured images. The main characteristic of the panoramic image is that a viewer may easily view the "panorama" of the overall space through one image.

There are three methods for generating a panoramic image. The first method includes: fixing a plurality of general cameras at the center of the overall space; capturing, by the general cameras, images of the overall space at different angles; stitching the captured images into a sphere image by an image stitching algorithm; and locating a viewer at the center of the sphere, so that the viewer can view the panorama of the overall space only by changing an angle of view without switching scenes, wherein the sphere image is a panoramic image of the overall space. The second method includes: using a single general camera or an aerial camera at the center of the overall space to capture images of the overall space at different angles, and stitching the captured images by an image stitching algorithm to obtain a sphere image as described in the first method. The third method includes: capturing images of the overall space by a large angle of view of a single panoramic camera; correcting the captured images by a virtual PTZ (Pan/Tilt/Zoom) control correction technique to obtain a corresponding rectangular developed image as a panoramic developed image (panoramic image) of the overall space; and viewing an area on the panoramic developed image by a viewer setting PTZ parameters.

For an overall space with a wide field of view, the panoramic image generated by the above three methods may cover the "panorama" of the space. However, for an overall space with irregular structure (such as a room with many walls and many corners), the panoramic image generated by the above methods does not cover the "panorama" of the overall space and cannot bring a three-dimensional real-scene effect, thus the overall space cannot be visually viewed at a three-dimensional angle of view. Specifically, on the one hand, in terms of the above first and second methods, if the images of the overall space are captured at different angles by the plurality of general cameras fixed at the center of the overall space or the single general camera positioned at the center of the overall space, then local spaces at another side of a corner and behind a wall of the overall space cannot be covered by a shooting coverage(s) of the camera(s) due to the irregular structure of the overall space. Therefore, a sphere image stitched based on the captured images cannot cover all local spaces of the overall space and cannot achieve the three-dimensional real-scene effect. Even if multiple sphere images are generated for the local spaces of the overall space, the viewer cannot view the panorama of the overall space through one image and need to switch back and forth among multiple spheres to view the panorama of the overall space, since the sphere images cannot be stitched together. On the other hand, in terms of the third method described above, since only a single panoramic camera is used, all local spaces of an overall space with irregular structure cannot be covered and all local spaces of the overall space also cannot be covered by the obtained rectangular developed image. Therefore, it is impossible to allow the viewer to view the panorama of the overall space. Moreover, since the panoramic developed image obtained by the third method described above is actually a two-dimensional image and have no three-dimensional real-world effect, the overall space cannot be visually view at a three-dimensional angle of view and the panoramic developed image is not a real panoramic image.

Therefore, how to design a method for generating a panoramic image capable of covering all local spaces of an overall space with irregular structure is an urgent technical problem to be solved in the art.

SUMMARY

The embodiment of the present invention provides a method and device for generating a panoramic image, which are capable of solving the problem that a panoramic image generated for an overall space with irregular structure cannot cover each local space of the overall space in the related art.

According to an embodiment of the present application, there is provided a method for generating a panoramic image, including:

acquiring an original two-dimensional image of each of local spaces in an overall space captured respectively by each of panoramic cameras;

determining, for each of local spaces, a cuboid three-dimensional image of the local space according to the original two-dimensional image of the local space and a preset cuboid model corresponding to the local space; and generating a three-dimensional panoramic image of the overall space according to determined cuboid three-dimensional images of all local spaces.

Optionally, determining the cuboid three-dimensional image of the local space according to the original two-dimensional image of the local space and the preset cuboid model corresponding to the local space includes: determining, according to each original pixel in the original two-dimensional image of the local space, each projected pixel obtained by projecting each original pixel on the preset cuboid model corresponding to the local space; and determining the cuboid three-dimensional image of the local space according to all determined projection pixels.

Optionally, determining, according to each original pixel on the original two-dimensional image of the local space, each projected pixel obtained by projecting each original pixel on the preset cuboid model corresponding to the local space, includes: determining a circumscribed spherical surface of the preset cuboid model corresponding to the local space, wherein a radius of the circumscribed spherical surface is not greater than a visible distance of the panoramic camera, and the original two-dimensional image of the local space is located directly below the preset cuboid model corresponding to the local space; determining, for each original pixel in the original two-dimensional image of the local space, a projection of the original pixel on the circumscribed spherical surface as a spherical pixel in a direction perpendicular to a plane of the original two-dimensional image; determining a line connecting a spherical center of the circumscribed spherical surface and the spherical pixel; taking an intersection point between the line and a surface of the preset cuboid model corresponding to the local space as the projected pixel obtained by projecting the original pixel on the preset cuboid model corresponding to the local space; and taking a pixel value of the original pixel as a pixel value of the projected pixel corresponding to the original pixel.

Optionally, generating the three-dimensional panoramic image of the overall space according to the determined cuboid three-dimensional images of all local spaces, includes: stitching cuboid three-dimensional images corresponding to all local spaces respectively according to relative positions among respective preset cuboid models corresponding to the local spaces, to generate the three-dimensional panoramic image of the space.

Optionally, stitching cuboid three-dimensional images corresponding to all local spaces respectively according to relative positions among respective preset cuboid models corresponding to the local spaces, includes: placing the cuboid three-dimensional images according to the relative positions among the respective preset cuboid models corresponding to the local spaces; determining a stitching area between adjacent cuboid three-dimensional images; mixing, for each stitching area, mixed pixels of cuboid three-dimensional images contained in the stitching area, to generate a cuboid image corresponding to the stitching area; and stitching the cuboid three-dimensional images corresponding to all local spaces according to cuboid images corresponding to all stitching areas.

Optionally, determining the stitching area between adjacent cuboid three-dimensional images, includes: for each pair of adjacent cuboid three-dimensional images, determining an overlapping portion of the pair of cuboid three-dimensional images; taking a midpoint of a center line of the pair of cuboid three-dimensional images as a center of the stitching area; and taking the whole or part of the overlapping portion as the stitching area according to the overlapping portion and the center of the stitching area; and mixing pixels of cuboid three-dimensional images contained in the stitching area, includes: weighted mixing pixel values of mixed pixels of the pair of cuboid three-dimensional images contained in the stitching area as pixel values of stitching pixels of the stitching area.

According to an embodiment of the present application, there is provided an apparatus for generating a panoramic image including:

an original two-dimensional image acquisition module, configured for acquiring an original two-dimensional image of each of local spaces in an overall space captured respectively by each of panoramic cameras;

a cuboid three-dimensional image determining module, configured for determining, for each of local spaces, a cuboid three-dimensional image of the local space according to the original two-dimensional image of the local space and a preset cuboid model corresponding to the local space; and a three-dimensional panoramic image generating module, configured for generating a three-dimensional panoramic image of the overall space according to determined cuboid three-dimensional images of all local spaces.

Optionally, the cuboid three-dimensional image determining module is configured for determining, according to each original pixel in the original two-dimensional image of the local space, each projected pixel obtained by projecting each original pixel on the preset cuboid model corresponding to the local space; and determining the cuboid three-dimensional image of the local space according to all determined projection pixels.

Optionally, the cuboid three-dimensional image determining module is configured for determining a circumscribed spherical surface of the preset cuboid model corresponding to the local space, wherein a radius of the circumscribed spherical surface is not greater than a visible distance of the panoramic camera, and the original two-dimensional image of the local space is located directly below the preset cuboid model corresponding to the local space; determining, for each original pixel in the original two-dimensional image of the local space, a projection of the original pixel on the circumscribed spherical surface as a spherical pixel in a direction perpendicular to a plane of the original two-dimensional image; determining a line connecting a spherical center of the circumscribed spherical surface and the spherical pixel; taking an intersection point between the line and a surface of the preset cuboid model corresponding to the local space as the projected pixel obtained by projecting the original pixel on the preset cuboid model corresponding to the local space; and taking a pixel value of the original pixel as a pixel value of the projected pixel corresponding to the original pixel.

Optionally, the three-dimensional panoramic image generating module is configured for, stitching cuboid three-dimensional images corresponding to all local spaces respectively according to relative positions among respective preset cuboid models corresponding to the local spaces, to generate the three-dimensional panoramic image of the space.

Optionally, the three-dimensional panoramic image generating module is configured for, placing the cuboid three-dimensional images according to the relative positions among the respective preset cuboid models corresponding to the local spaces; determining a stitching area between adjacent cuboid three-dimensional images; mixing, for each stitching area, mixed pixels of cuboid three-dimensional images contained in the stitching area, to generate a cuboid image corresponding to the stitching area; and stitching the cuboid three-dimensional images corresponding to all local spaces according to cuboid images corresponding to all stitching areas.

Optionally, the three-dimensional panoramic image generating module is configured for, for each pair of adjacent cuboid three-dimensional images, determining an overlapping portion of the pair of cuboid three-dimensional images; taking a midpoint of a center line of the pair of cuboid three-dimensional images as a center of the stitching area; taking the whole or part of the overlapping portion as the stitching area according to the overlapping portion and the center of the stitching area; and weighted mixing pixel values of mixed pixels of the pair of cuboid three-dimensional images contained in the stitching area as pixel values of stitching pixels of the stitching area.

According to an embodiment of the present application, there is provided an electronic device including a memory and a processor. The memory is configured for storing an executable code. The processor executes the executable code stored in the memory, to implement a method for generating a panoramic image according to the embodiment of the present application. The method for generating the panoramic image includes:

acquiring an original two-dimensional image of each of local spaces in an overall space captured respectively by each of panoramic cameras;

determining, for each of local spaces, a cuboid three-dimensional image of the local space according to the original two-dimensional image of the local space and a preset cuboid model corresponding to the local space; and generating a three-dimensional panoramic image of the overall space according to determined cuboid three-dimensional images of all local spaces.

According to an embodiment of the present application, there is provided a storage medium for storing an executable code which, when executed, performs the method for generating a panoramic image according to the embodiment of the present application. The method for generating the panoramic image includes:

acquiring an original two-dimensional image of each of local spaces in an overall space captured respectively by each of panoramic cameras;

determining, for each of local spaces, a cuboid three-dimensional image of the local space according to the original two-dimensional image of the local space and a preset cuboid model corresponding to the local space; and generating a three-dimensional panoramic image of the overall space according to determined cuboid three-dimensional images of all local spaces.

The at least one technical solution according to the embodiment of the present application can bring the following effects.

In the embodiment, the cuboid three-dimensional image of each local space in the overall space is determined according to the original two-dimensional image of this local space and the preset cuboid model corresponding to this local space, and then the three-dimensional panoramic image of the overall space is generated by all determined cuboid three-dimensional images. Since the three-dimensional panoramic image of the overall space is generated according to the cuboid three-dimensional images of all local spaces, the overall space may be visually viewed at a three-dimensional angle of view, achieving the three-dimensional real-scene effect.

BRIEF DESCRIPTION OF THE DRAWINGS

The drawings described herein are used to provide further understanding of the present application, and form a part of the present application. The schematic embodiments and description herein are used to explain the present application and do not constitute improper limitations to the present application. In the drawings.

DETAILED DESCRIPTION

In order to make the objectives, technical solutions, and advantages of the present application clearer and more understandable, the present application will be described clearly and completely below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

The technical solutions according to the embodiments of the present application are described in detail below with reference to the accompanying drawings.

Figure 1:
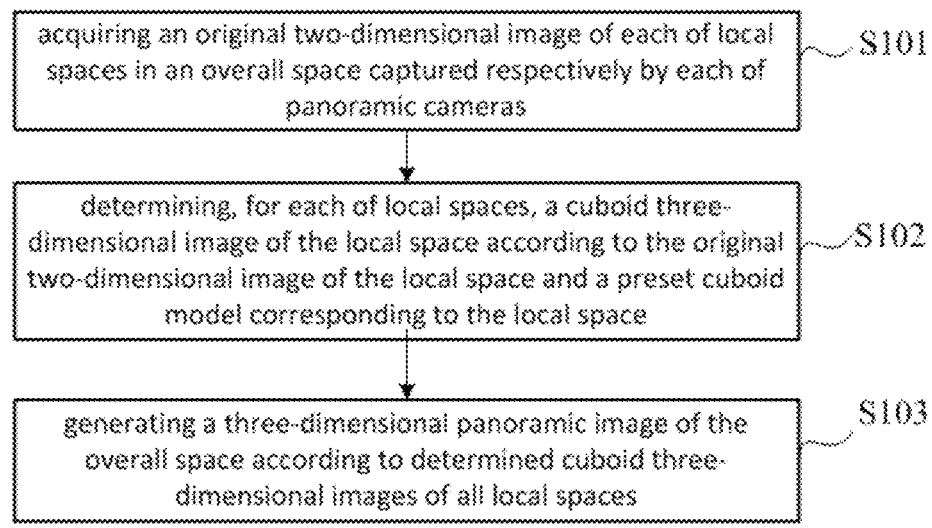
FIG. 1 is a flowchart of a method for generating a panoramic image according to an embodiment of the present application.

FIG. 1 is a flowchart of a method for generating a panoramic image according to an embodiment of the present application. The method includes S101-S103.

S101: acquiring an original two-dimensional image of each of local spaces in an overall space captured respectively by each of panoramic cameras.

In the embodiment of the present application, the method may be executed by any device with image processing function, such as an electronic computer, an image processing device, and the like. For example, the method may be executed by a control device of a video monitoring system.

In the embodiment of the present application, the panoramic camera may be a camera having a super large angle of view and capable of shooting an image of a specific space in a wide range without a blind angle, and may be, for example, a fisheye camera. For convenience of description, the embodiment of the present application is explained by taking a fisheye camera as an example, which does not constitute a limitation to the present application.

In the embodiment of the present application, the structure of the overall space may be irregular. For example, there may be many walls and corners in the overall space, so that the field of view of the overall space is not wide, and thus the panorama of the overall space cannot be captured at multiple angles of view or by a single panoramic camera.

Figure 2A:
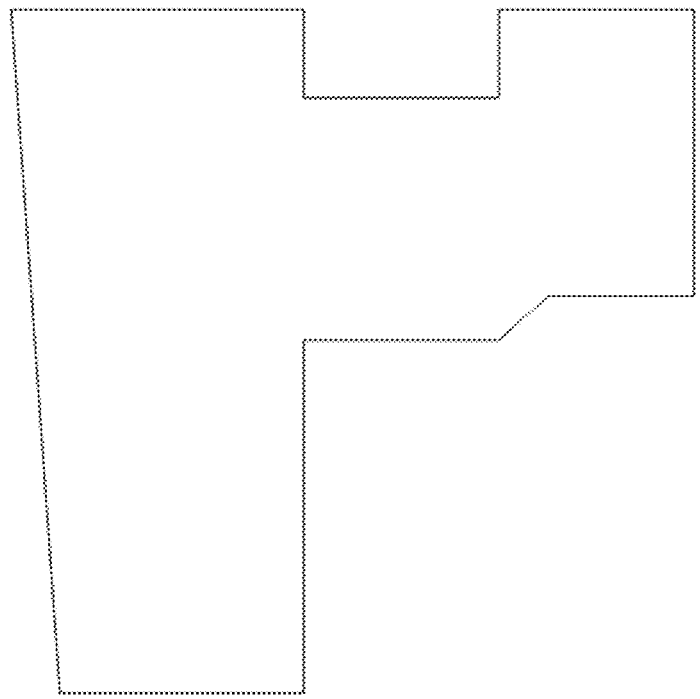
FIG. 2a is a plane top view of an overall space with irregular structure according to an embodiment of the present application.

FIG. 2a is a plane top view of an overall space with irregular structure according to an embodiment of the present application. As shown in FIG. 2a, the boundary of the overall space is irregular, and there are many walls and corners that block the field of view. The overall space is roughly "L" shaped.

In one embodiment of the present application, the method for generating a panoramic image divides the overall space into a plurality of local spaces each of which can be covered by the shooting coverage of a single fisheye camera, and establishes preset cuboid models corresponding to the local spaces respectively. Then, based on the projection principle behind fish-eye cameras, according to original two-dimensional images of each local space captured by each fisheye camera, the method colors a preset cuboid model of this local space, and takes the colored preset cuboid model as a cuboid three-dimensional image. Finally, according to all cuboid three-dimensional images, the method generates a three-dimensional panoramic image of the overall space.

Therefore, before the step S101 is performed, some preparation may be completed by a technician in advance, including a measurement of parameters of the overall space, a division of the overall space into local spaces, an installation of a single fisheye camera in each of local spaces, and an establishment of a preset cuboid model for each of local spaces. Alternatively, the preparation described above may also be implemented based on machine vision and intelligent algorithms in accordance with a preset measurement rule, dividing rule, and model-building rule.

Figure 2B:
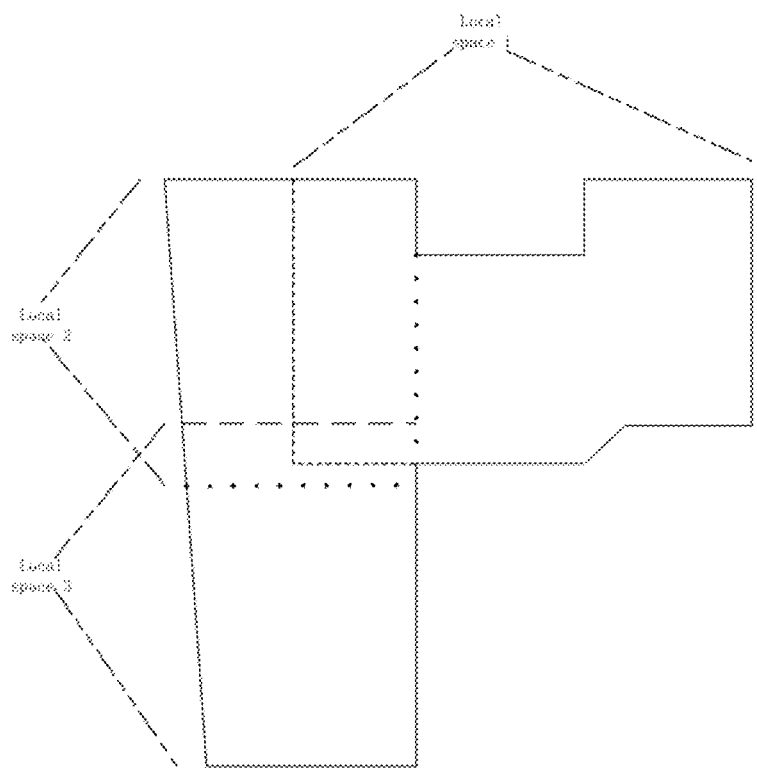
FIG. 2b is a plane top view after the division of the overall space shown in FIG. 2a according to an embodiment of the present application.

Taking the overall space shown in FIG. 2a as an example, according to the structure of the overall space, the overall space is divided into a plurality of local spaces in advance. The rule of the division is that, the field of view of each of local spaces is wide and does not exceeds the visible area of the fisheye camera, to ensure that a single fisheye camera mounted on the upper surface of the local space can shoot an image of the local space without dead angle. Based on the rule, there are many ways to divide the overall space, which is not limited in this application. It should be emphasized that there may be an overlapping portion between the divided local spaces, or there may be no overlapping portion between the divided local spaces. FIG. 2b is a plane top view after the division of the overall space shown in FIG. 2a according to an embodiment of the present application. As shown in FIG. 2b, the overall space is divided into three local spaces. The dividing lines of the three local spaces are respectively represented by different lines. The dividing line of the local space 1 is a short dashed line, the dividing line of the local space 2 is a dot-dashed line, and the dividing line of the local space 3 is a long dashed line. There are overlapping portions between the three local spaces.

Figure 2C:
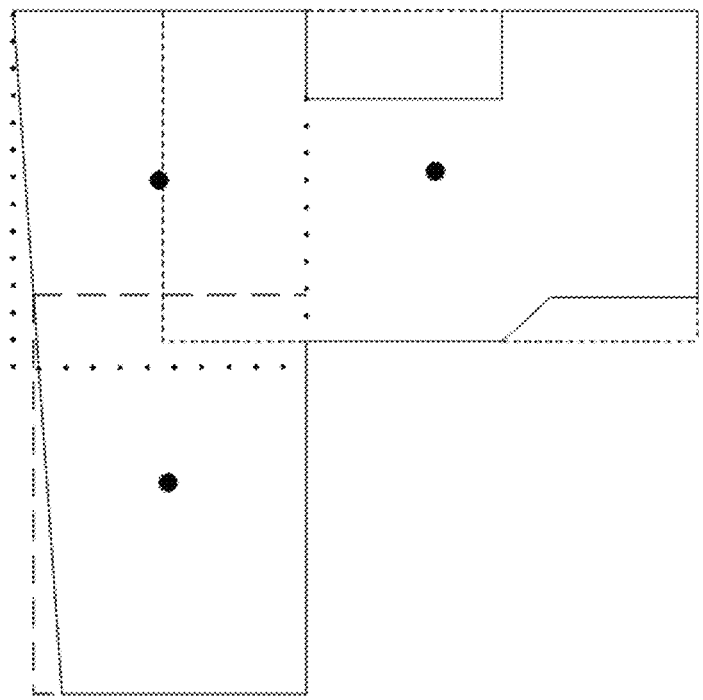
FIG. 2c is a plane top view showing preset cuboid models respectively corresponding to all local spaces in the overall space shown in FIG. 2b according to an embodiment of the present application.

After the division of the overall space into the local spaces, the preset cuboid model corresponding to each of local spaces is determined according to the structure of this local space. The central position of the upper surface of each preset cuboid model may be a position of a fisheye camera installed in a local space corresponding to this preset cuboid model, and each preset cuboid model may be a cuboid capable of completely surrounding the local space corresponding to this preset cuboid model, in particular a minimum circumscribed cuboid of the local space corresponding to this preset cuboid model. FIG. 2c is a plane top view showing preset cuboid models corresponding to all local spaces in the overall space shown in FIG. 2b according to an embodiment of the present application. As shown in FIG. 2c, a big black dot represents the fisheye camera, and the newly added boundaries of the three preset cuboid models are respectively represented by different lines, as described above with respect to FIG. 2b. The preset cuboid model described above corresponds to a projection model shown in FIG. 5.

As another embodiment, the center of the middle section of each preset cuboid model in the horizontal direction may be the position of the fisheye camera installed in the local space corresponding to this preset cuboid model, and each preset cuboid model may be a cuboid capable of completely surrounding the local space corresponding to this preset cuboid model. The preset cuboid model corresponds to a projection model shown in FIG. 4.

Figure 3:
FIG. 3 shows original two-dimensional images of three local spaces captured respectively by three fisheye cameras shown in FIG. 2c according to an embodiment of the present application.

In the embodiment of the present application, the original two-dimensional image of each of local spaces acquired respectively by each of fisheye cameras is a circular two-dimensional plane image. FIG. 3 shows original two-dimensional images of three local spaces captured respectively by three fisheye cameras shown in FIG. 2c according to an embodiment of the present application.

S102: determining, for each local space, a cuboid three-dimensional image of the local space according to the original two-dimensional image of the local space and a preset cuboid model corresponding to the local space.

In the embodiment of the present application, according to a specific number of original pixels in the original two-dimensional image of the local space, each projected pixel obtained by projecting each of the specific number of original pixels on the preset cuboid model corresponding to the local space may be respectively determined; and then the cuboid three-dimensional image of the local space is determined according to the determined projected pixels.

In the embodiment of the present application, the specific number of original pixels may be all original pixels in the original two-dimensional image, and may be also a part of the original pixels in the original two-dimensional image. Specifically, the part of the original pixels in the original two-dimensional image of the local space may be extracted, in a certain interval, in an arranging order of all original pixels, from all original pixels of the original two-dimensional image. There may be some ways of extracting a part of the original pixels, as long as a two-dimensional image with low-resolution composed of the extracted original pixels can retain main information of the original two-dimensional image to a certain extent.

A method for determining a cuboid three-dimensional image of the local space will be explained in detail in an embodiment of the present application. In order to make it possible to obtain a three-dimensional image of the local space with high-resolution, the method may respectively determine, according to all original pixels in the original two-dimensional image of the local space, each projected pixel obtained by projecting each of the original pixels on the preset cuboid model corresponding to the local space, and determines a cuboid three-dimensional image of the local space according to the determined projected pixels.

Figure 4:
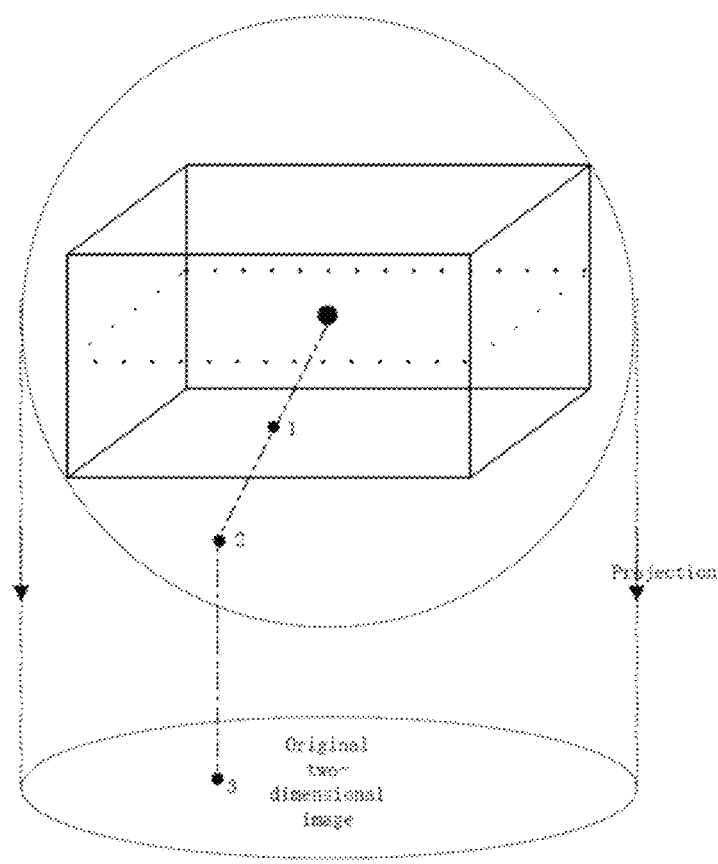
FIG. 4 is a schematic diagram of a projection model of a fisheye camera according to an embodiment of the present application.

Based on the projection principle of the fisheye camera, the visible area of the fisheye camera may be considered as a hemispherical surface, and the captured original two-dimensional image is considered as a plane image which is a projected image of the hemispherical surface directly below the hemispherical surface. FIG. 4 is a schematic diagram of a projection model of a fisheye camera according to an embodiment of the present application. As shown in FIG. 4, the center of the circumscribed spherical surface of the preset cuboid model corresponding to the local space may be considered as a position at which the fisheye camera is installed; the middle section of the preset cuboid model including the center of the sphere in the horizontal direction may be considered as the upper surface of the local space; the lower half part of the preset cuboid model may be considered as the local space; and the lower half part of the circumscribed spherical surface may be considered as the visible area of the fisheye camera. The plane image which is a projected image of the visible area of the fisheye camera directly below the visible area is the original two-dimensional image. Point 1 is a projected pixel on the lower surface of the preset cuboid model of the local space, point 2 corresponding to point 1 is a pixel projected on the spherical surface, and point 3 is an original pixel obtained by projecting point 2 on the plane in the vertical direction.

Figure 5:
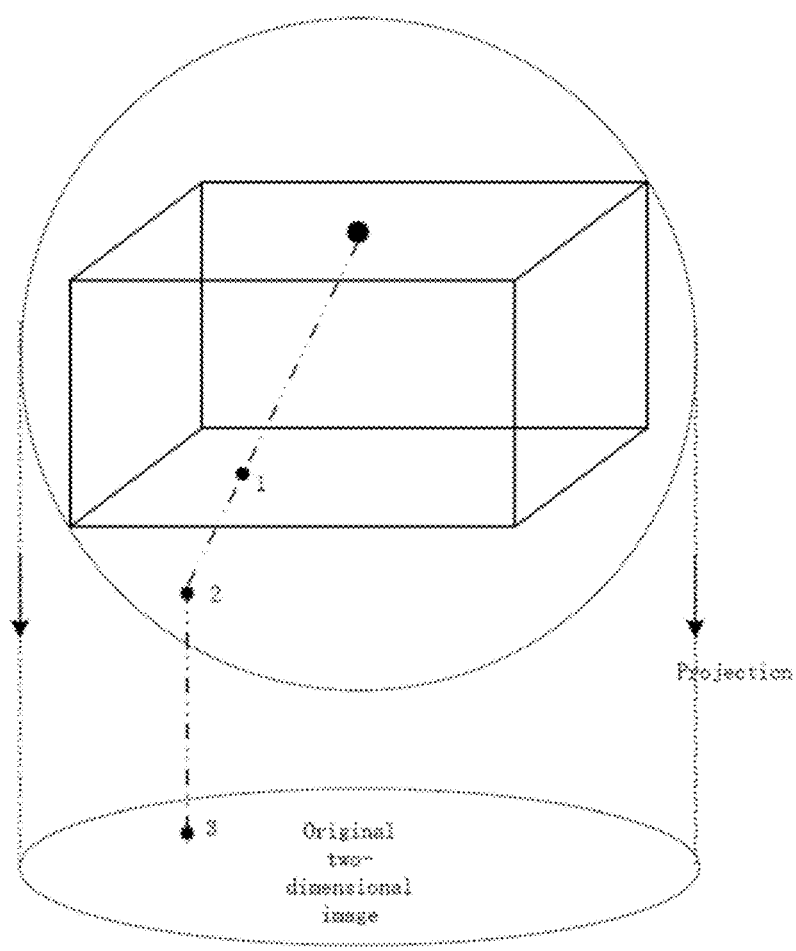
FIG. 5 is a schematic diagram of a projection model of another fisheye camera according to an embodiment of the present application.

FIG. 5 is a schematic diagram of a projection model of another fisheye camera according to an embodiment of the present application. Based on the projection principle of the fisheye camera, the center position of the upper surface of the preset cuboid model may also be considered as a position where the fisheye camera is installed, the upper surface of the preset cuboid model may be considered as the upper surface of the local space, the preset cuboid model may be considered as the local space, and a part of the circumscribed spherical surface below the upper surface of the preset cuboid model may be considered as a visible area of the fisheye camera. The plane image which is a projected image of the visible area of the fisheye camera directly below the visible area is the original two-dimensional image. The point 1, the point 2, the point 3 are the same as points 1, 2 and 3 in FIG. 4. In the embodiment of the present application, there may be various projection models of the fisheye camera, and each projection model may be placed horizontally as shown in FIGS. 4 and 5, or may be placed obliquely. In short, the projection model is not specifically limited in the present application, as long as the correspondence between the projected pixels on each surface of the cuboid and the original pixels on the original two-dimensional image may be established based on the projection principle of the fisheye camera.

It should be noted that a certain image redundancy may exist in the cuboid three-dimensional image of the local space determined by some projection models (the projection model shown in FIG. 5), and the image redundancy may be discarded in subsequent processing. Different projection models of the fisheye camera correspond to different methods for determining projected pixels. Specifically, based on the projection model of the fisheye camera shown in FIG. 4, the embodiment of the present application provides a method for respectively determining, according to all original pixels in the original two-dimensional image of the local space, each projected pixel obtained by projecting each of all the original pixels on the preset cuboid model corresponding to the local space. This method includes:

determining a circumscribed spherical surface of the preset cuboid model corresponding to the local space, wherein a radius of the circumscribed spherical surface is not greater than a visible distance of the panoramic camera, and an original two-dimensional image of the local space is located directly below the preset cuboid model corresponding to the local space; determining, for each original pixel in the original two-dimensional image of the local space, the projection of the original pixel on the circumscribed spherical surface as a spherical pixel in a direction perpendicular to the plane of the original two-dimensional image; determining a line connecting the spherical center of the circumscribed spherical surface and the spherical pixel; taking an intersection point between the line and a surface of the preset cuboid model corresponding to the local space as a projected pixel obtained by projecting the original pixel on the preset cuboid model corresponding to the local space; taking a pixel value of the original pixel as a pixel value of the projected pixel corresponding to the original pixel.

The original two-dimensional image of the local space is located directly below the preset cuboid model corresponding to the local space. Specifically, the original two-dimensional image may be located on a plane parallel to the upper surface or the lower surface of the preset cuboid model. The plane parallel to the upper surface or the lower surface of the preset cuboid model may be a plane other than the circumscribed spherical surface.

Figure 6:
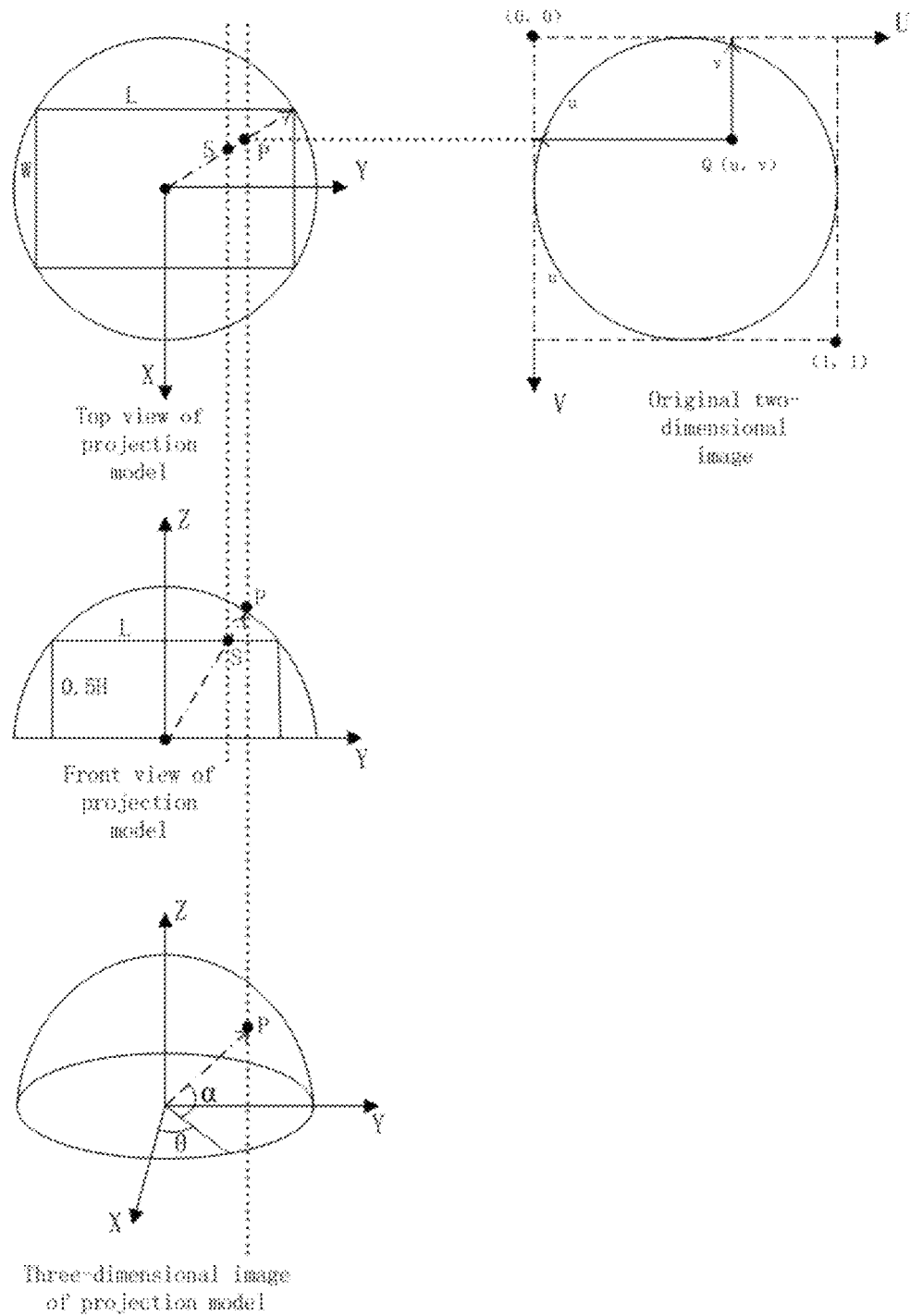
FIG. 6 is a schematic diagram showing a method for determining a cuboid three-dimensional image by the projection model shown in FIG. 4 according to an embodiment of the present application.

FIG. 6 is a schematic diagram showing a method for determining a cuboid three-dimensional image by the projection model shown in FIG. 4 according to the present application. As shown in FIG. 6, it is assumed that the coordinate of the upper left corner of the original two-dimensional image of the local space is (0, 0), and the coordinate of the lower right corner of the original two-dimensional image of the local space is (1, 1), and a point Q (u, v) in the original two-dimensional image of the local space is known. In the projection model shown in FIG. 4, it is assumed that the diameter of the circumscribed spherical surface is 1, points corresponding to the point Q area point on the spherical surface, that is, a spherical pixel P (x, y, z), and an intersection point on the bottom surface of the preset cuboid model, that is, a projected pixel S(x', y', z'), and the length, width and height (pre-measured) of the preset cuboid model are L, W, H, respectively. In the case that the intersection point between the connecting line and the surface of the preset cuboid model corresponding to the local space is at the bottom surface of the preset cuboid model, the values of x, y, z, x', y', z' can be calculated by the following formula:

$u-0.5=x=0.5*\cos(\alpha)*\cos(\theta);$ $v-0.5=y=0.5*\cos(\alpha)*\sin(\theta);$ $z=0.5*\sin(\alpha);$ $x'=(y'/y)*x;$ $y'=(0.5H/z)*y;$ $z'=0.5H;$ where u, v, H are known. Furthermore, since the point S is located on the bottom surface of the preset cuboid model, the parameters L and W are not required in this example.

According to a similar calculation method, the coordinate of each projected pixel respectively corresponding to each original pixel on the original two-dimensional image may be obtained. It should be noted that the above calculation formula is only applicable to the case that the projection pixel is located on the bottom surface of the preset cuboid model. When the projected pixel is located on other surfaces of the preset cuboid model, different calculation formulas will be used, but the principles of the calculation are the same, which will not be repeated here.

Figure 7:
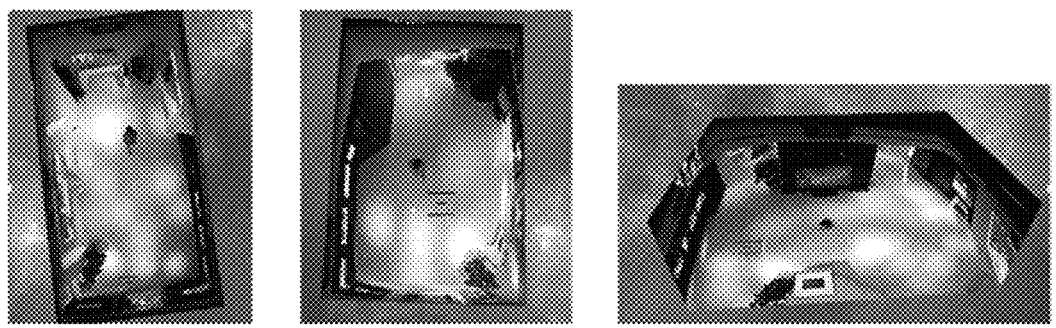
FIG. 7 is an effect diagram showing the cuboid three-dimensional images generated respectively based on the original two-dimensional images shown in FIG. 3 according to an embodiment of the present application.

In the embodiment of the present application, after each projected pixel obtained by projecting each original pixel on the preset cuboid model corresponding to the local space is determined, the preset cuboid model corresponding to the local space is colored, and the colored preset cuboid model of the local space is taken as a cuboid three-dimensional image of the local space. FIG. 7 is an effect diagram showing cuboid three-dimensional images generated respectively based on the original two-dimensional images shown in FIG. 3 according to an embodiment of the present application.

S103: generating a three-dimensional panoramic image of the overall space according to determined cuboid three-dimensional images of all local spaces.

Specifically, the S103 may comprise: stitching cuboid three-dimensional images corresponding to all local spaces respectively according to relative positions among respective preset cuboid models corresponding to the local spaces respectively, to generate a three-dimensional panoramic image of the space.

Figure 8:
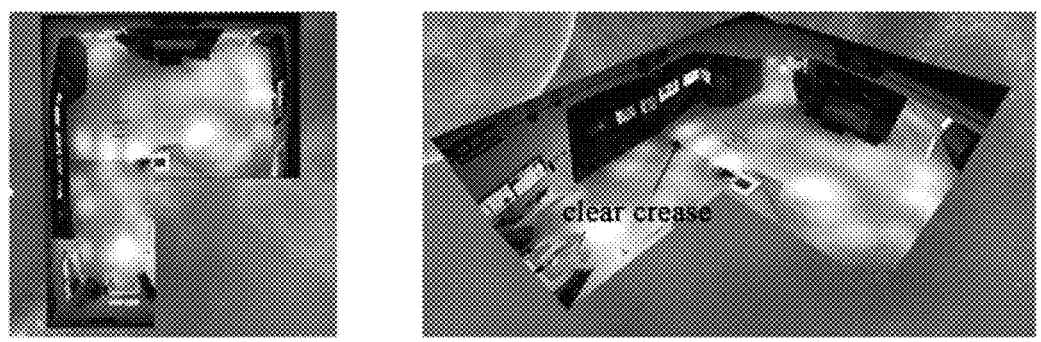
FIG. 8 is an effect diagram showing a three-dimensional panoramic image of the overall space generated after the stitching of all cuboid three-dimensional images according to an embodiment of the present application.

In the embodiment of the present application, the cuboid three-dimensional images may be placed according to the relative positions among respective preset cuboid models corresponding to the local spaces, and then the stitching among the cuboid three-dimensional images may be adjusted until the cuboid three-dimensional images are fully merged, so as to obtain a three-dimensional panoramic image of the overall space, as shown in FIG. 8. FIG. 8 is an effect diagram showing a three-dimensional panoramic image of the overall space generated after the direct stitching of all cuboid three-dimensional images according to an embodiment of the present application.

However, as shown in FIG. 8, there are clear creases in the three-dimensional panoramic image obtained by directly stitching and adjusting all the cuboid three-dimensional images, and the transition of color at the creases is unnatural, so it is necessary to further process the transition.

In the embodiment of the present application, the S103 includes an implement of processing the transition, which may include: placing the cuboid three-dimensional images according to relative positions among the respective preset cuboid models corresponding to the local spaces; determining stitching area between adjacent cuboid three-dimensional images; mixing, for each stitching area, mixed pixels of cuboid three-dimensional images contained in the stitching area, to generate a cuboid image corresponding to the stitching area; stitching cuboid three-dimensional images corresponding to all local spaces according to cuboid images corresponding to all stitching areas.

Specifically, there are various methods for mixing, for each stitching area, the mixed pixels of the cuboid three-dimensional images contained in the stitching area, that is, there are various methods for performing the transition processing on the stitching of the cuboid three-dimensional images. For example, the pixel values of mixed pixels overlapped in each stitching area may be averaged, and the resulting average value is taken as the pixel values of the stitching pixels corresponding to the overlapped mixed pixels. Alternatively, after the pixel values of the mixed pixels are averaged, the pixel value of a mixed pixel whose pixel value is closest to the resulting average value is taken as the pixel values of the stitching pixels corresponding to the mixed pixels. In short, there are various methods for the transition processing, which is not limited in this application.

In addition, for each stitching area, the number of adjacent cuboid three-dimensional images in the stitching area may be more than two. According to the stitching algorithm of the two adjacent cuboid three-dimensional images in the stitching areas, the stitching algorithm of a plurality of adjacent cuboid three-dimensional images in the stitching areas is directly derived based on the same technical idea, which is obvious to those skilled in the art.

However, it should be noted that, since a traditional image stitching needs to be performed in a central processing unit (CPU) of a device, and texture content needs to be copied from the graphics processing unit (GPU) of the device, the entire image stitching is very time consuming, which affects the real-time performance of viewing the three-dimensional panoramic image by the viewer. The present application may utilize a GPU transition processing method, which writes a stitching transition processing algorithm into the GPU, which in turn is directly executed by the GPU. In this way, the time-consuming copying of the texture content may be avoided. At the same time, in order to achieve a better stitching effect, the present application may use a stitching transition processing algorithm in which the overlapped mixed pixels of two cuboid three-dimensional images in the stitching area are weighted mixed.

The following is a transition processing algorithm for stitching all cuboid three-dimensional images according to an embodiment of the present application, which can achieve a better stitching effect. Taking two adjacent cuboid three-dimensional images contained in each stitching area as an example, in order to determine the stitching area between the adjacent cuboid three-dimensional images, for each pair of adjacent cuboid three-dimensional images, an overlapping portion of the pair of the cuboid three-dimensional images is determined; a midpoint of a center line of the pair of cuboid three-dimensional images is taken as a center of the stitching area; the whole or part of the overlapping portion is taken as the stitching area according to the center and the overlapping portion of the stitching area; and the pixel values of the mixed pixels of the pair of cuboid three-dimensional images contained in the stitching area is weighted mixed as the pixel values of the stitching pixels of the stitching area. Of course, the midpoint of the center line of the pair of adjacent preset cuboid models may not be taken as the center of the stitching area, but a point near the midpoint of the center line may be taken as the center of the stitching area. The present application is not limited thereto.

In the preparation before the performance of the method claimed in the present application, in order to ensure that the single fisheye camera mounted on the upper surface of each local space can shoot an image of the local space without dead angle, overlapping portions may exist among preset cuboid models of all local spaces determined in advance, thus overlapping portions exist between cuboid three-dimensional images that are finally determined. In actual operation, in order to complete the stitching of the cuboid three-dimensional images, a part of each overlapping portion is cropped out, and the remaining of each overlapping portion is taken as a stitching area, which is sufficient to achieve the natural color transition.

Specifically, a midpoint of a center line of each pair of adjacent preset cuboid models is taken as the center of the stitching area. A part of the overlapping portion is taken as the stitching area. The length of the stitching area may be the distance of 20-25 continuous pixels. The width and height of the stitching area are the same as those of the overlapping portion. The specific weighted mixing algorithm may be determined based on the position of the mixed pixels of the pair of adjacent cuboid three-dimensional image in the stitching area.

Figure 9:
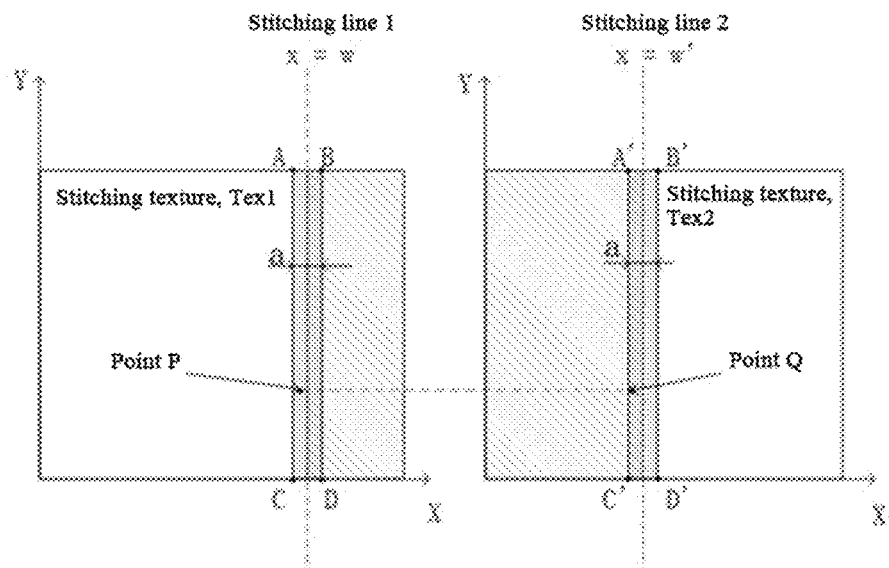
FIG. 9 is a schematic plane view showing a transition processing algorithm according to an embodiment of the present application.

FIG. 9 is a schematic plane view showing a transition processing algorithm according to an embodiment of the present application. As shown in FIG. 9, for each image of the two adjacent cuboid three-dimensional images, the light-colored area is a part of overlapping portion that is cropped out, and the dark-colored area is the remaining of the overlapping portion, that is, the stitching area. The stitching lines 1 and 2 are vertical lines passing through the midpoint of the stitching area, the length of the stitching area is a (the distance of 20-25 continuous pixels), the equation about the stitching line 1 is x=w, and the equation about the stitching line 2 is x=w'. For the adjacent two cuboid three-dimensional images, the textures Tex1 and Tex2 of the mixed pixels contained in the stitching area are mixed. For example, an arbitrary point P(Px, Py) is located on Tex1, and a point Q(Qx, Qy) with which the point P is mixed is located on Tex2. The formula for mixing is as follows:

Alpha=abs(*Px*−*w*)/*a*;

Color=Alpha*Tex1(*Px,Py*)+(1−Alpha)*Tex2(*Qx,Qy*);

where, Alpha represents the weight of the point P when the point P and the point Q are mixed, Color represents the pixel value of the stitching pixel for the point P and the point Q, abs is the obtaining of an absolute value of a target value, and R is a rotation matrix, and T is a transform matrix.

In this algorithm, for each pair of mixed pixels, in order to apply the above calculation formula Alpha=abs(Px−w)/a, and Color=Alpha*Tex1(Px,Py)+(1−Alpha)*Tex2(Qx,Qy), the coordinates of them need to be determined based on the same coordinate system. Therefore, it is necessary to use the rotation matrix R and the transform matrix T to establish the correspondence between the coordinates of each pair of mixed pixels, that is, the formula $$R * \begin{bmatrix} P_x \\ P_y \end{bmatrix} + T = \begin{bmatrix} Q_x \\ Q_y \end{bmatrix}.$$

That is to say, for the point P and the point Q, the rotation matrix R and the transform matrix T may be used to transform one of the coordinates of the point P and the coordinates of the point Q into the same coordinate system as the other.

Since the R and T are different for each pair of adjacent cuboid three-dimensional images that need to be stitched, the GPU needs to determine the R and T of the adjacent cuboid three-dimensional images that need to be stitched before calculating the pixel values of the stitching pixels.

As shown in FIG. 9, in the case that the R and T are unknown, and the point P is known, the GPU cannot determine the corresponding mixed pixel Q under the same coordinate system. However, since the endpoint of the stitching area is known and the correspondence between A and A' is also known, the GPU may obtain the coordinates of the endpoint A' according to the coordinates of the endpoint A under the same coordinate system, as shown in FIG. 9. This is the same for points B, C, D. Then, R and T are obtained by put the coordinates of the obtained endpoints into the formula $$R * \begin{bmatrix} P_x \\ P_y \end{bmatrix} + T = \begin{bmatrix} Q_x \\ Q_y \end{bmatrix}.$$

For example, if the coordinates of endpoints A and A' are put into the formula, then $$R * \begin{bmatrix} P_x \\ P_y \end{bmatrix} + T = \begin{bmatrix} A'_x \\ A'_y \end{bmatrix}$$

is obtained. This is the same for the coordinates of the other endpoints.

After R and T are obtained, in the stitching process, for example, for a pair of mixed pixels P and Q, if the coordinates of the point P are known, the coordinates of the mixed pixel Q may be calculated according to the above formula $$R * \begin{bmatrix} P_x \\ P_y \end{bmatrix} + T = \begin{bmatrix} Q_x \\ Q_y \end{bmatrix}.$$

Then, according to the coordinates of the point P and the coordinates of the point Q, the pixel value Color of the stitching pixel may be obtained by the formula Alpha=abs(Px−w)/a, and Color=Alpha*Tex1(Px,Py)+(1−Alpha)*Tex2(Qx,Qy).

Figure 10:
FIG. 10 is an effect diagram showing the three-dimensional panoramic image on which the transition processing algorithm is performed according to an embodiment of the present application.

The pixel value of each stitching pixel in the stitching area may be determined according to the above transition processing algorithm. FIG. 10 is an effect diagram showing a three-dimensional panoramic image after the transition processing algorithm according to an embodiment of the present application. As shown in FIG. 10, there are no clear creases at the stitching area.

With the method shown in FIG. 1, the cuboid three-dimensional image of each local space in the overall space is determined according to the original two-dimensional image of this local space and the preset cuboid model corresponding to this local space, and then the three-dimensional panoramic image of the overall space is generated by all determined cuboid three-dimensional images. Since the three-dimensional panoramic image of the overall space is generated according to the cuboid three-dimensional images of all local spaces, the overall space may be visually viewed at a three-dimensional angle of view, achieving the three-dimensional real-scene effect.

In addition to solving the technical problems described in the background art and achieving the above technical effect, the technical solution in the present application can bring a further technical effect. On the one hand, the three-dimensional panoramic image generated by the method shown in FIG. 1, compared to the traditional technology for stitching multiple images shot at multiple angles, can create a more vivid sense of reality, and allow the viewer to overlook it, view it from front, view it from side and roam the scene. On the other hand, the three-dimensional panoramic image generated by the method shown in FIG. 1 is different from the plane two-dimensional panoramic developed image obtained by correcting, through the PTZ, an image captured by a single panoramic camera.

Figure 11:
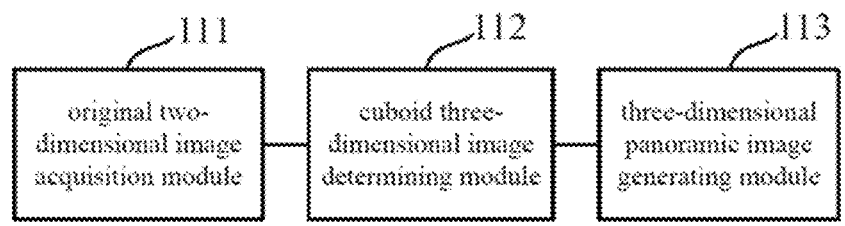
FIG. 11 is a schematic diagram of an apparatus for generating a panoramic image according to an embodiment of the present application.

Based on the method for generating a panoramic image shown in FIG. 1, an embodiment of the present application further correspondingly provides an apparatus for generating a panoramic image, as shown in FIG. 11.

FIG. 11 is a schematic diagram of an apparatus for generating a panoramic image according to an embodiment of the present application, including:

an original two-dimensional image acquisition module 111, configured for acquiring an original two-dimensional image of each of local spaces in an overall space captured respectively by each of panoramic cameras;

a cuboid three-dimensional image determining module 112, configured for determining, for each of local spaces, a cuboid three-dimensional image of the local space according to the original two-dimensional image of the local space and a preset cuboid model corresponding to the local space; and a panoramic image generating module 113, configured for generating a three-dimensional panoramic image of the overall space according to determined cuboid three-dimensional images of all local spaces.

The cuboid three-dimensional image determining module 112 is specifically configured for determining, according to each original pixel in the original two-dimensional image of the local space, each projected pixel obtained by projecting each original pixel on the preset cuboid model corresponding to the local space; and determining the cuboid three-dimensional image of the local space according to all determined projection pixels.

The cuboid three-dimensional image determining module 112 is specifically configured for determining a circumscribed spherical surface of the preset cuboid model corresponding to the local space, wherein a radius of the circumscribed spherical surface is not greater than a visible distance of the panoramic camera, and the original two-dimensional image of the local space is located directly below the preset cuboid model corresponding to the local space; determining, for each original pixel in the original two-dimensional image of the local space, a projection of the original pixel on the circumscribed spherical surface as a spherical pixel in a direction perpendicular to a plane of the original two-dimensional image; determining a line connecting a spherical center of the circumscribed spherical surface and the spherical pixel; taking an intersection point between the line and a surface of the preset cuboid model corresponding to the local space as the projected pixel obtained by projecting the original pixel on the preset cuboid model corresponding to the local space; and taking a pixel value of the original pixel as a pixel value of the projected pixel corresponding to the original pixel.

The three-dimensional panoramic image generating module 113 is specifically configured for, stitching cuboid three-dimensional images corresponding to all local spaces respectively according to relative positions among respective preset cuboid models corresponding to the local spaces, to generate the three-dimensional panoramic image of the space.

The three-dimensional panoramic image generating module 113 is specifically configured for, placing the cuboid three-dimensional images according to the relative positions among the respective preset cuboid models corresponding to the local spaces; determining a stitching area between adjacent cuboid three-dimensional images; mixing, for each stitching area, mixed pixels of cuboid three-dimensional images contained in the stitching area, to generate a cuboid image corresponding to the stitching area; and stitching the cuboid three-dimensional images corresponding to all local spaces according to cuboid images corresponding to all stitching areas.

The three-dimensional panoramic image generating module 113 is specifically configured for determining, for each pair of adjacent cuboid three-dimensional images, determining an overlapping portion of the pair of cuboid three-dimensional images; taking a midpoint of a center line of the pair of cuboid three-dimensional images as a center of the stitching area; taking the whole or part of the overlapping portion as the stitching area according to the overlapping portion and the center of the stitching area; and weighted mixing pixel values of mixed pixels of the pair of cuboid three-dimensional images contained in the stitching area as pixel values of stitching pixels of the stitching area.

Since the above embodiment of an apparatus is obtained based on the embodiment of a method, the embodiment of apparatus has the same technical effect as the method, which is not described herein again. The embodiment of the apparatus is described briefly since it is substantially similar to the embodiment of the method. Related contents can refer to the part that describes the embodiment of the method.

The embodiment of the present application provides an electronic device, applicable to the generation of a panoramic image. The electronic device includes a memory and a processor. The memory may store an executable code. The processor may execute the executable code stored in the memory, to implement a method for generating a panoramic image according to the embodiment of the present application. The method for generating a panoramic image includes:

acquiring an original two-dimensional image of each of local spaces in an overall space captured respectively by each of panoramic cameras;

determining, for each of local spaces, a cuboid three-dimensional image of the local space according to the original two-dimensional image of the local space and a preset cuboid model corresponding to the local space; and generating a three-dimensional panoramic image of the overall space according to determined cuboid three-dimensional images of all local spaces.

The electronic device exists in various forms, including but not limited to:

(1) Mobile communication device: such a device is characterized by its mobile communication functions and is mainly aimed at providing voice and data communication. Such terminals include: smart phones (such as iPhone), multimedia phones, functional phones, and low-end phones and the like.

(2) Ultra-mobile personal computer device: such a device belongs to the category of personal computers, which has computing and processing functions, and generally has mobile Internet access feature. Such terminals include: PDAs, MIDs, and UMPC devices and the like, such as the iPad.

(3) Portable entertainment device: such a device may display and play multimedia content. Such a device includes: audio, video players (such as iPod), handheld game player, e-books, and smart toys and portable onboard navigation equipment.

(4) Server: it is a device that provides computing services. The configuration of the server comprises a processor, a hard disk, a memory, a system bus, etc. The server is similar to common computer architecture, but since it is necessary to provide highly reliable services, therefore, the processing capacity, stability, reliability, security, extensibility, and manageability are highly required.

(5) Other electronic devices with data interaction functions.

It can be seen that, in this embodiment, the cuboid three-dimensional image of each local space in the overall space may be determined according to the original two-dimensional image of this local space and the preset cuboid model corresponding to this local space, and then the three-dimensional panoramic image of the overall space is generated by all determined cuboid three-dimensional images. Since the three-dimensional panoramic image of the overall space is generated according to the cuboid three-dimensional images of all local spaces, the overall space may be visually viewed at a three-dimensional angle of view, achieving the three-dimensional real-scene effect.

An embodiment of the present application provides a storage medium for storing an executable code which, when executed, performs a method for generating a panoramic image according to the embodiment of the present application. The method for generating a panoramic image includes:

acquiring an original two-dimensional image of each of local spaces in an overall space captured respectively by each of panoramic cameras;

determining, for each of local spaces, a cuboid three-dimensional image of the local space according to the original two-dimensional image of the local space and a preset cuboid model corresponding to the local space; and generating a three-dimensional panoramic image of the overall space according to determined cuboid three-dimensional images of all local spaces.

It can be seen that, in this embodiment, the cuboid three-dimensional image of each local space in the overall space may be determined according to the original two-dimensional image of this local space and the preset cuboid model corresponding to this local space, and then the three-dimensional panoramic image of the overall space is generated by all determined cuboid three-dimensional images. Since the three-dimensional panoramic image of the overall space is generated according to the cuboid three-dimensional images of all local spaces, the overall space may be visually viewed at a three-dimensional angle of view, achieving the three-dimensional real-scene effect.

In one typical configuration, a computing device comprises one or more processor (CPU), an input/output interface, a network interface and a memory.

The memory may include volatile memory, random access memory (RAM), and/or non-volatile memory in a computer readable medium, such as read-only memory (ROM) or flash memory (flash RAM). The memory is an example of a computer readable medium.

Computer readable media including permanent and non-permanent, removable and non-removable medias, which may achieve information storage by any method or technology. The information may be a computer readable instruction, a data structure, a module of program, or other data. The example of the computer storage media, including but not limited to phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digital versatile disk (DVD) or other optical storage, magnetic cassette tape, magnetic tape magnetic disk storage or other magnetic storage devices or any other non-transmission media, may be configured to store the information that can be accessed by a computing device. As defined herein, the computer readable media does not include transitory media, such as modulated data signals and carrier waves.

Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

Those skilled in the art will appreciate that embodiments of the present application may be provided as a method, system, or computer program product. Thus, the present application may be implemented in a form of hardware, software or a combination of software and hardware. Moreover, the present application may be implemented in a form of a computer program product implemented on one or more computer-usable storage media (including but not limited to disk storage, CD-ROM, optical storage, etc.) including computer usable program code.

The embodiments described above are merely embodiments of the present application, and not intended to limit the present application. Various modifications and changes can be made to the present application by those skilled in the art. Any modifications, equivalents, improvements or the like within the spirit and principle of the application should be included in the scope of the application.

What is claimed is:

1. A method for generating a panoramic image, comprising:

acquiring an original two-dimensional image of each of local spaces in an overall space captured respectively by each of panoramic cameras;

determining, for each of local spaces, a cuboid three-dimensional image of the local space according to the original two-dimensional image of the local space and a preset cuboid model corresponding to the local space, wherein a center of an upper surface of the preset cuboid model corresponding to the local space is a position of the panoramic camera installed in the local space or a center of a middle section of the preset cuboid model corresponding to the local space in horizontal direction is the position of the panoramic camera installed in the local space, and the preset cuboid model corresponding to the local space is a cuboid capable of completely surrounding the local space; and generating a three-dimensional panoramic image of the overall space by directly stitching the determined cuboid three-dimensional images of all local spaces.

2. The method of claim 1, wherein, determining the cuboid three-dimensional image of the local space according to the original two-dimensional image of the local space and the preset cuboid model corresponding to the local space, comprises:

determining, according to each original pixel in the original two-dimensional image of the local space, each projected pixel obtained by projecting each original pixel on the preset cuboid model corresponding to the local space; and determining the cuboid three-dimensional image of the local space according to all determined projection pixels.

3. The method of claim 2, wherein, determining, according to each original pixel on the original two-dimensional image of the local space, each projected pixel obtained by projecting each original pixel on the preset cuboid model corresponding to the local space, comprises:

determining a circumscribed spherical surface of the preset cuboid model corresponding to the local space, wherein a radius of the circumscribed spherical surface is not greater than a visible distance of the panoramic camera, and the original two-dimensional image of the local space is located directly below the preset cuboid model corresponding to the local space;

determining, for each original pixel in the original two-dimensional image of the local space, a projection of the original pixel on the circumscribed spherical surface as a spherical pixel in a direction perpendicular to a plane of the original two-dimensional image;

determining a line connecting a spherical center of the circumscribed spherical surface and the spherical pixel;

taking an intersection point between the line and a surface of the preset cuboid model corresponding to the local space as the projected pixel obtained by projecting the original pixel on the preset cuboid model corresponding to the local space; and taking a pixel value of the original pixel as a pixel value of the projected pixel corresponding to the original pixel.

4. The method of claim 1, wherein, generating the three-dimensional panoramic image of the overall space by directly stitching the determined cuboid three-dimensional images of all local spaces, comprises:

stitching cuboid three-dimensional images corresponding to all local spaces respectively according to relative positions among respective preset cuboid models corresponding to the local spaces, to generate the three-dimensional panoramic image of the space.

5. The method of claim 4, wherein, stitching cuboid three-dimensional images corresponding to all local spaces respectively according to relative positions among respective preset cuboid models corresponding to the local spaces, comprises:

placing the cuboid three-dimensional images according to the relative positions among the respective preset cuboid models corresponding to the local spaces;

determining a stitching area between adjacent cuboid three-dimensional images;

mixing, for each stitching area, mixed pixels of cuboid three-dimensional images contained in the stitching area, to generate a cuboid image corresponding to the stitching area; and stitching the cuboid three-dimensional images corresponding to all local spaces according to cuboid images corresponding to all stitching areas.

6. The method of claim 5, wherein, determining the stitching area between adjacent cuboid three-dimensional images, comprises:

for each pair of adjacent cuboid three-dimensional images, determining an overlapping portion of the pair of cuboid three-dimensional images;

taking a midpoint of a center line of the pair of cuboid three-dimensional images as a center of the stitching area; and taking the whole or part of the overlapping portion as the stitching area according to the overlapping portion and the center of the stitching area;

and wherein, mixing pixels of cuboid three-dimensional images contained in the stitching area, comprises:

weighted mixing pixel values of mixed pixels of the pair of cuboid three-dimensional images contained in the stitching area as pixel values of stitching pixels of the stitching area.

7. A non-transitory storage medium for storing an executable code which, when executed, performs the method for generating a panoramic image according to claim 1.

8. An electronic device, comprising a memory and a processor, wherein the memory is configured for storing an executable code, and the processor executes the executable code stored in the memory, so as to cause the processor to perform operations of:

acquiring an original two-dimensional image of each of local spaces in an overall space captured respectively by each of panoramic cameras;

determining, for each of local spaces, a cuboid three-dimensional image of the local space according to the original two-dimensional image of the local space and a preset cuboid model corresponding to the local space, wherein a center of an upper surface of the preset cuboid model corresponding to the local space is a position of the panoramic camera installed in the local space or a center of a middle section of the preset cuboid model corresponding to the local space in horizontal direction is the position of the panoramic camera installed in the local space, and the preset cuboid model corresponding to the local space is a cuboid capable of completely surrounding the local space; and generating a three-dimensional panoramic image of the overall space by directly stitching the determined cuboid three-dimensional images of all local spaces.

9. The electronic device of claim 8, wherein the processor is further caused to perform operations of:

determining, according to each original pixel in the original two-dimensional image of the local space, each projected pixel obtained by projecting each original pixel on the preset cuboid model corresponding to the local space; and determining the cuboid three-dimensional image of the local space according to all determined projection pixels.

10. The electronic device of claim 9, wherein, the processor is further caused to perform operations of:

determining a circumscribed spherical surface of the preset cuboid model corresponding to the local space, wherein a radius of the circumscribed spherical surface is not greater than a visible distance of the panoramic camera, and the original two-dimensional image of the local space is located directly below the preset cuboid model corresponding to the local space;

determining, for each original pixel in the original two-dimensional image of the local space, a projection of the original pixel on the circumscribed spherical surface as a spherical pixel in a direction perpendicular to a plane of the original two-dimensional image;

determining a line connecting a spherical center of the circumscribed spherical surface and the spherical pixel;

taking an intersection point between the line and a surface of the preset cuboid model corresponding to the local space as the projected pixel obtained by projecting the original pixel on the preset cuboid model corresponding to the local space; and taking a pixel value of the original pixel as a pixel value of the projected pixel corresponding to the original pixel.

11. The electronic device of claim 8, wherein, the processor is further caused to perform operations of:

stitching cuboid three-dimensional images corresponding to all local spaces respectively according to relative positions among respective preset cuboid models corresponding to the local spaces, to generate the three-dimensional panoramic image of the space.

12. The electronic device of claim 11, wherein, the processor is further caused to perform operations of:

placing the cuboid three-dimensional images according to the relative positions among the respective preset cuboid models corresponding to the local spaces;

determining a stitching area between adjacent cuboid three-dimensional images;

mixing, for each stitching area, mixed pixels of cuboid three-dimensional images contained in the stitching area, to generate a cuboid image corresponding to the stitching area; and stitching the cuboid three-dimensional images corresponding to all local spaces according to cuboid images corresponding to all stitching areas.

13. The electronic device of claim 12, wherein, the processor is further caused to perform operations of:

for each pair of adjacent cuboid three-dimensional images, determining an overlapping portion of the pair of cuboid three-dimensional images;

taking a midpoint of a center line of the pair of cuboid three-dimensional images as a center of the stitching area; and taking the whole or part of the overlapping portion as the stitching area according to the overlapping portion and the center of the stitching area;

and wherein, mixing pixels of cuboid three-dimensional images contained in the stitching area, comprises:

weighted mixing pixel values of mixed pixels of the pair of cuboid three-dimensional images contained in the stitching area as pixel values of stitching pixels of the stitching area.

* * * * *